United States Patent [19]

Thomas

[11] 4,099,948
[45] Jul. 11, 1978

[54] BUSHING FOR PROCESSING MOLTEN GLASS

[75] Inventor: John Stuart Thomas, St. Helena, England

[73] Assignee: Fibreglass Limited, St. Helena, England

[21] Appl. No.: 822,257

[22] Filed: Aug. 5, 1977

Related U.S. Application Data

[63] Continuation of Ser. No. 669,090, Mar. 22, 1976, abandoned.

[30] Foreign Application Priority Data

Apr. 2, 1975 [GB] United Kingdom ............... 13516/75

[51] Int. Cl.² .............................................. C03B 37/02
[52] U.S. Cl. ......................................... 65/1; 29/527.5;
65/374 M; 65/DIG. 4
[58] Field of Search ................. 65/1, 374 M, DIG. 4;
29/527.1, 527.5

[56] References Cited

U.S. PATENT DOCUMENTS

| 3,488,172 | 1/1970 | Aliotta | 65/1 |
| 3,512,948 | 5/1970 | Glaser | 65/1 X |
| 3,972,702 | 8/1976 | McCormick | 65/1 |

Primary Examiner—Robert L. Lindsay, Jr.
Attorney, Agent, or Firm—Schuyler, Birch, Swindler, McKie & Beckett

[57] ABSTRACT

This invention relates to a bushing for processing molten glass. The bushing has a bottom wall provided with orifices to deliver downwardly flowing streams of molten glass, side walls and end walls. The bushing is provided with oppositely arranged terminals to receive electrical conductors for heating the bushing. The end walls of the bushing and the terminal means are moulded integrally from rhodium or platinum/rhodium alloy.

5 Claims, 6 Drawing Figures

BUSHING FOR PROCESSING MOLTEN GLASS

This is a continuation, of application Ser. No. 669,090, filed Mar. 22, 1976 now abandoned.

BACKGROUND OF THE INVENTION

This invention relates to a bushing or feeder, for processing molten glass of the kind having a bottom wall for delivering streams of molten glass for attenuation into fibres and side walls and end walls extending upwardly from the bottom wall, terminal means being provided on each end wall for connecting electrical energy to the feeder to heat said walls. The invention also includes a method of making a bushing of the kind referred to above.

The invention more particularly relates to an improvement or modification of a bushing or feeder of the type described in U.K. patent specification No. 1,215,743 in the name of Owens-Corning Fiberglas. That specification describes various designs of lugs or terminal means designed to afford an area to which a terminal clamp connecting the lug to a bus-bar can be affixed. As indicated in that specification, in order to achieve a uniform distribution of current density across the end walls, it is necessary to design the lugs to achieve a line of equipotential extending across the end wall substantially parallel with a line defined by the junction of the bottom and end walls. Each terminal means has an outer portion to receive an electrical connection and an inner portion including at least two elements providing spaced contact on the end wall.

In constructing a bushing end wall complete with terminal means, as at present practised, it is necessary to fabricate each assembly from the individual parts, and then weld those parts together to form the assembly. That process, apart from involving a considerable amount of cutting of metal pieces from sheets of different thickness with consequent loss of metal, can introduce a variable resistance in the wall end leading to poor running of the bushing. We have now found that by forming the complete assembly by a lost was casting process, we can attain the following benefits:

1. A reduction in the time taken to construct a bushing.
2. A considerable reduction in metal loss during manufacture, and the amount of valuable metal carried in stock.
3. The possibility of consistent manufacture in terms of actual dimensions and electrical characteristics.
4. As a result of more consistent and better electrical characteristics, a better bushing in terms of manufacturing performance, and ease of running during the normal life of the bushing.
5. Reduce the actual weight of metal used in the terminal and wall together.

SUMMARY OF THE INVENTION

According to the invention therefore, there is provided a bushing for processing molten glass comprising a bottom wall accommodating a plurality of rows of orifices for delivering streams of molten glass for attenuation into fibres, side and end walls extending upwardly from the said bottom wall and oppositely disposed terminal means made from material selected from the group consisting of platinum and platinum/rhodium alloy and formed integrally with the end walls of the bushing by an investment casting process. The terminal means may be formed integral with the end walls of the bushing for connecting electrical energy to heat the bushing, each of the said terminal means having an inner portion connected with an end wall at respective positions along a line extending across the end wall substantially parallel with a line defined by the junction of the bottom and end wall.

The invention also includes a method for making a bushing for processing molten glass and constructed in accordance with the invention comprising the steps of (a) making a wax pattern of the bushing by placing the wax into a shaped mould and allowing it to solidify, (b) removing the wax pattern from the mould and investing it with a fine refractory slurry to form a refractory coating on the pattern, (c) building up the refractory coating by stuccoing it with sand in a plurality of repeated stages, (d) allowing the coated pattern by dry out, (e) removing the wax from the coated pattern to form a mould (f) firing the mould at a high temperature to produce a mould forthe bushing, (g) casting the bushing in the mould in a vacuum furnace.

The manufacture of other than simple parts of a bushing by a casting process has not previously been considered feasible as in general, because of the high melting point of platinum and its alloys, platinum has only been used in casting relatively small items such as jewellery. We have found that in fact the adverse problems expected in casting relatively large objects in platinum can be avoided with care e.g. the formation of blow holes due to evolution of any gas from the mould.

The mould used in the casting process can be conveniently fabricated in the following manner:

1. Make a wax pattern of the part to be manufactured by placing the wax into a shaped mould and allowing it to solidify.

2. Remove the wax pattern from the mould and invest it with a slurry of a fine refractory. The slurry is made from a mixture of hydrolised ethyl silicate and a fine refractory powder, for this application we prefer to use an alumina, a zirconia, or a fused silica refractory powder.

3. The refractory coat is further built up by stuccoing with a suitable refractory such as zircon sand. The investment is then allowed to set in an ammonia atmosphere for a few minutes. This operation is then repeated until a coating of refractory about 3/16 inches thick is built up over the wax pattern.

4. The coated pattern is then allowed to dry out for several hours.

5. The wax is removed from the coated pattern either by melting or by dissolving out with a suitable organic solvent to form a mould.

6. The mould is then fired at a high temperature 800°–1000° C to remove all residual wax and alcohol.

The investment casting process has been described using the term "wax" to describe the disposable material from which the pattern is made. The wax is one of the standard and readily available materials but equivalent materials include thermoplastics such as nylon and liquid metals and alloys such as mercury in a solid state.

The casting operation is carried out in a vacuum furnace. The required weight of platinum or platinum/rhodium alloy is melted under vacuum and the temperature adjusted to the optimum value for casting. This operation is carried out under high vacuum. The vacuum is then broken during the operation of pouring the metal into the mould to minimise the evolution of any gas from the mould which would have subsequent adverse effects on the casting, such as the formation of blow holes etc.

The invention will now be described by reference to the accompanying drawings.

DETAILED DESCRIPTION OF INVENTION

Figure 1:
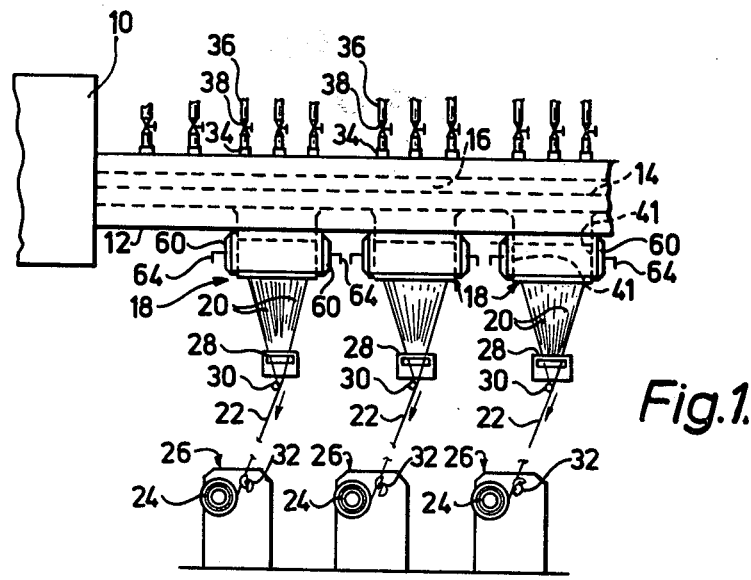
FIG. 1 is a semi-schematic elevational view of a forehearth and bushing arrangement for use with the teachings of this invention.

Referring to the drawings in detail, FIG. 1 is a semi-schematic elevational view illustrating a forehearth construction of a direct melt system for supplying heat-softened glass to a plurality of stream feeders or bushings associated with the forehearth. The glass batch is introduced into a melting and refining furnace or tank 10 at an end region of the furnace opposite the forehearth 12 which is connected with the melting and refining furnace.

The glass batch is reduced to a flowable or molten condition in the furnace 10 and the molten glass is traversed to the furnace 10 to effect a refining of the glass whereby refined glass 14 is delivered from the furnace into the forehearth channel 16 lengthwise of the forehearth. The glass is processed to render it suitable for attenuation into filaments or fibres. Spaced lengthwise along the forehearth 12 are stream feeders or bushings 18 which have end walls and terminals cast in one piece according to the present invention.

The floor or tip section of each feeder or bushing is provided with orifice means through which flow streams of glass attenuated into filaments 20 by winding a strand 22 of the filaments upon a rotating collector 24 of the winding machine 26 by conventional construction, there being a winding apparatus for the filaments derived from each feeder.

The streams may be attenuated into fibres or filaments by other attenuating methods. An applicator 28 may be provided for each group of filaments for delivering binder or coating material on to each group of filaments. The filaments of each group are converged into a strand by gathering shoe 30. During winding of the strand on a collector 24 a rotatable and reciprocable traverse means 32 engages the strand for distributing the strand lengthwise on a collector 24 to form a package. During winding, the rotation of the traverse 32 oscillates the strand 22 to cause the individual wraps or convolutions of strand to be collected on the collector in crossing relation in a conventional manner.

The glass in the forehearth is maintained in a flowable condition by applying heat by means of burners 34 disposed in the roof of the forehearth 12, the burners being supplied with fuel gas and air mixture through tubular means 36 connected with a mixture supply, a valve means 38 being associated with each burner construction for regulating the delivery of fuel and air mixture to the burner. The burners are preferably of the radiant type but may be of any suitable character for establishing heat in the forehearth channel 16 to control the temperature of the glass 14 in the forehearth channel.

Figure 2:
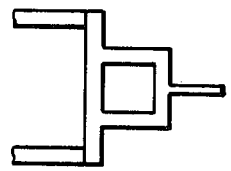
FIG. 2 is a plan view of a bushing showing an end wall and terminal connection, the wall and terminal having been cast in one piece.
Figure 3:
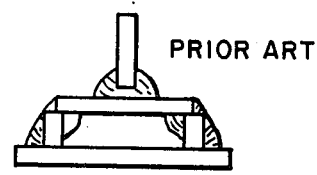
FIG. 3 is a schematic plan view of a welded bushing end wall and terminal.

Illustrated in FIG. 2 is an embodiment of the new type of bushing formed with integrally cast end walls and terminals and for comparison the construction of a bushing with a welded terminal in FIG. 3. The bushing is fashioned from an alloy of platinum capable of withstanding the high temperature of molten glass and having a reasonable resistance to corrosion at the operating temperature of the bushing.

As indicated at page 5 lines 32 to 46 of U.K. patent specification No. 1,215,743 it was previously considered desirable to use rolled or rod type plate materials when dealing with platinum and rhodium alloys in order to obtain the greatest strength. It is clear from that passage that it was considered desirable to reduce the amount of welding so as to avoid the chances of hot spots occuring during operation of the bushing at high temperatures. We have found that we can eliminate welding entirely as an operation during the the construction of the end wall of the bushing without the introduction of any further complications. We find in fact that there is little difference in electrical resistivity however the occurrence of hot spots between a well constructed bushing end wall involving welding of the end walls, and a bushing having terminals cast integrally with the end walls is less in the cast form. However, it is easier to achieve consistency and reliability in production of bushings using the casting technique and with a considerable reduction in cost.

Figures 4A, 4B:
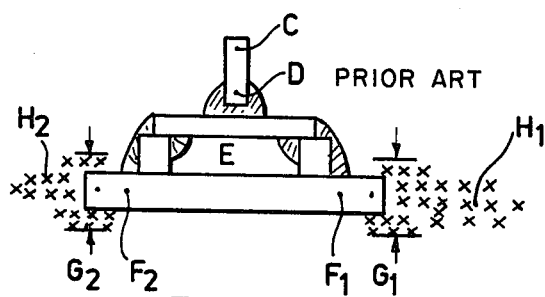
FIG. 4a,b,c, are figures illustrating how comparative electrical measurements were made on a welded wall and terminal and a cast wall and terminal.
Figure 4C:
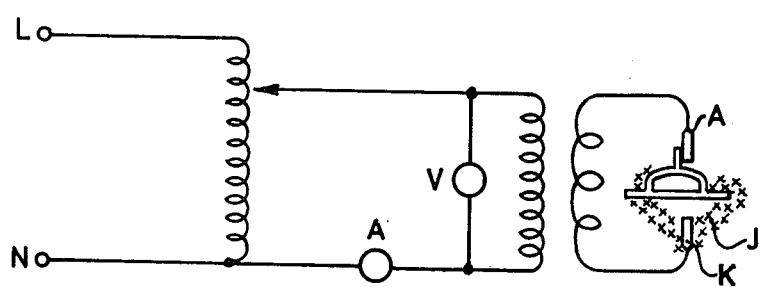

Comparative measurements were made on four bushings ends to compare the distribution of resistance in two types of bushing, that with a cast integral terminal in the end wall according to the present invention, and a bushing having an end wall with the terminal welded in place, and itself formed by welding a number of parts together. The measurements were made at various points to determine voltage drop, these points are indicated in the diagrams of FIG. 4. FIG. 4a is of the welded bushing wall and terminal and shows where connections were clamped to the bushing end. FIG. 4b shows a cast bushing wall and terminal, this was supplied with connections during measurement in the same manner as the welded end. FIG. 4c shows how the primary of the transformer was connected across each bushing in turn. Measurements were made when the current in the transformer primary was about 4 amps and the voltage drop about 9 volts. Table 1 gives the actual values of current and voltage in the transformer primary for each bushing measured. Table II records the voltages at various points of the bushing ends. The measurements for D-E and E-F are a measurement of the drop across the terminal portion of the bushing and C - G, the voltage drop across the whole bushing end, wall and terminal. The results show that there is a slight difference in performance between the bushings, but that in practice there should be little difference in the overall electrical performance of the ends. There are certainly no gross voids present which could lead to serious over-heating of the bushing end wall and terminal in operation.

We have therefore provided a bushing for processing molten glass comprising a bushing end wall provided with orifices for delivering streams of molten glass for attenuation into glass filaments and oppositely disposed platinum or platinum/rhodium alloy terminal means formed integrally with the body of the bushing by a lost wax casting process.

TABLE I

VOLTAGES AND CURRENTS IN TRANSFORMER PRIMARY

|       | Welded 1 | Welded 2 | Cast CI | Cast C2 |
|-------|----------|----------|---------|---------|
| Volts | 8.97     | 8.95     | 9.02    | 8.97    |
| Amps  | 4.1      | 4.0      | 4.1     | 4.0     |

TABLE II

VOLTAGE DISTRIBUTION IN BUSHING ENDS
VOLTAGE (IN mV) measured relative to 'A' and Difference

| POSITION | WELDED 1 | | WELDED 2 | | CAST CI | | CAST C2 | |
|---|---|---|---|---|---|---|---|---|
| A | 0.0 | | 0.0 | | 0.0 | | 0.0 | |
|   |     | 2.5 |   | 2.6 |   | 2.9 |   | 3.2 |
| B | 2.5 | | 2.6 | | 2.9 | | 3.2 | |
|   |     | 3.3 |   | 3.0 |   | 2.6 |   | 2.3 |
| C | 5.8 | | 5.6 | | 5.5 | | 3.5 | |
|   |     | 3.7 |   | 3.1 |   | 3.3 |   | 3.2 |
| D | 9.5 | | 8.7 | | 8.8 | | 8.6 | |
|   |     | 0.6 |   | 0.8 |   | 0.9 |   | 0.6 |
| E | 10.1 | 1.5 | 9.5 | 1.3 | 9.7 | 1.4 | 9.2 | 3.3 |
| $F_1$ | 1.3 / 11.6 | | −1.3 / 10.8 | 1.3 | 11.1 | 1.1 | 10.5 | |
| $F_2$ |  > 11.4 | 2.0 | 10.8 | 2.8 | 11.0 | 2.9 | 10.3 | 3.3 |
| $G_1$ | 2.6 \ 13.6 | | 1.7 / 13.6 | 2.4 | 14.0 | 2.2 | 13.8 | |
| $G_2$ |  > 14.0 | 6.7 | 12.5 | 4.1 | 13.4 | 6.2 | 12.3 | 3.6 |
| $H_1$ | 4.6 \ 20.3 | | 3.7 / 17.7 | 3.0 | 20.2 | 4.0 | 17.4 | |
| $H_2$ |  > 18.6 | 9.9 | 16.8 | 10.1 | 16.4 | 7.8 | 16.5 | 10.8 |
| J | 11.6 \ 30.2 | | 11.6 / 27.8 | | 11.6 / 18.0 | | 11.7 / 23.2 | |
|   |      | 18.8 |   | 21.0 |   | 20.5 |   | 20.4 |
| K | 49.0 | | 48.8 | | 48.5 | | 48.6 | |
| D-E | 0.6 | | 0.8 | | 0.9 | | 0.6 | |
| E-F | 1.5 | & 1.3 | 1.3 | & 1.3 | 1.3 | & 1.4 | 1.1 | & 1.3 |
| C-G | 7.8 | & 8.2 | 8.0 | & 6.9 | 7.9 | & 8.5 | 9.3 | & 7.0 |

What we claim is:

1. In a bushing for processing molten glass comprising a bushing body having a bottom and side and end walls extending upwardly from said bottom to form a hollow container; a plurality of rows of orifices in the bottom of said body for delivering streams of molten glass for attenuation into fibers, and terminal means associated with each of said end walls for connection to a source of electrical energy for heating said bushing; the improvement comprising each of said end walls and its associated terminal means being cast as a single, weld-free, integral unit by a lost wax investment casting process in a vacuum furnace from a material selected from the group consisting of platinum and platinum/-rhodium alloy.

2. A bushing according to claim 1 wherein the terminal means are formed integral with the end walls of the bushing for connecting electrical energy to heat the bushing, each of the said terminal means having an inner portion connected with an end wall at respective positions along a line extending across the end wall substantially parallel with a line defined by the junction of the bottom and end wall.

3. A bushing as recited in claim 1 wherein each terminal means comprises an outer portion for receiving an electrical connection and an inner portion comprising at least two elements providing spaced contact on the associated end wall.

4. A bushing as recited in claim 3 wherein said contact providing elements are spaced to achieve a line of equipotential extending across the associated end wall substantially parallel to a line defined by the junction of the end wall with the bottom of the bushing when the outer portion of the terminal is connected to a source of electrical potential in order to achieve a substantially uniform distribution of current density across the end wall.

5. A bushing as recited in claim 1 wherein the terminal means on the end walls of the bushing body are oppositely disposed.

* * * * *